(12) United States Patent  
Omoto (10) Patent No.: US 8,177,437 B2
(45) Date of Patent: May 15, 2012

(54) ROLLING BEARING, RETAINER SEGMENT AND MAIN SHAFT SUPPORT STRUCTURE OF WIND-POWER GENERATOR

(75) Inventor: Tatsuya Omoto, Suzuka (JP)

(73) Assignee: NTN Corporation, Osaka (JP)

( * ) Notice: Subject to any disclaimer, the term of this patent is extended or adjusted under 35 U.S.C. 154(b) by 553 days.

(21) Appl. No.: 12/086,856

(22) PCT Filed: Nov. 8, 2006

(86) PCT No.: PCT/JP2006/322266
§ 371 (c)(1),
(2), (4) Date: Jun. 20, 2008

(87) PCT Pub. No.: WO2007/072637

PCT Pub. Date: Jun. 28, 2007

(65) Prior Publication Data
US 2009/0074345 A1    Mar. 19, 2009

(30) Foreign Application Priority Data

Dec. 21, 2005  (JP) .................................. 2005-368588
Feb. 7, 2006   (JP) .................................. 2006-030088

(51) Int. Cl.
*F16C 33/46*    (2006.01)
(52) U.S. Cl. ....................................... 384/572; 384/580
(58) Field of Classification Search ........... 384/572–580
See application file for complete search history.

(56) References Cited

U.S. PATENT DOCUMENTS

| | | | | |
|---|---|---|---|---|
| 3,199,935 A | * | 8/1965 | Pitner | 384/573 |
| 3,477,773 A | * | 11/1969 | Altson | 384/576 |
| 4,239,304 A | * | 12/1980 | Wakunami | 384/573 |
| 5,009,525 A | * | 4/1991 | Brockmuller et al. | 384/576 |

FOREIGN PATENT DOCUMENTS

| | | |
|---|---|---|
| EP | 1 408 248 A2 | 4/2004 |
| FR | 1 339 859 | 10/1963 |
| GB | 2115889 A * | 9/1983 |
| JP | 40-004365 | 3/1965 |
| JP | 57-037123 | 2/1982 |
| JP | 59050224 A * | 3/1984 |

(Continued)

*Primary Examiner* — Thomas R Hannon
(74) *Attorney, Agent, or Firm* — Clark & Brody (57) ABSTRACT

A rolling bearing (11) comprises a plurality of rollers, and retainer segments (15a) retaining the rollers and split along a split line extending in an axial direction. The retainer segment (15a) has a plurality of pillar parts (22a), (22b), (22c) and (22d) extending in the axial direction so as to form first pockets (23a) and (23c) and a second pocket (23b) for housing the rollers, and a connection part extending in a circumferential direction so as to connect the plurality of pillar parts (22a) to (22d). Here, outer diameter side stopper parts (24a), (24b), (24c) and (24d) are provided on the outer diameter side of the pillar parts (22a) to (22d) positioned on the circumferential both sides of the first pockets (23a) and (23c) to limit the movement of the roller housed in the first pockets (23a) and (23c) toward the outer diameter side, and inner diameter side roller stopper parts (25a) and (25b) are provided on the inner diameter side of the pillar parts (22b) and (22c) positioned on the circumferential both sides of the second pocket (23b) to limit the movement of the roller housed in the second pocket (23b) toward the inner diameter side.

6 Claims, 6 Drawing Sheets

FOREIGN PATENT DOCUMENTS

| | | |
|---|---|---|
| JP | 64-58813 | 3/1989 |
| JP | 1-85521 | 6/1989 |
| JP | 5-19652 | 3/1993 |
| JP | 5-89952 | 12/1993 |
| JP | 2000-81042 | 3/2000 |
| JP | 2002-333027 | 11/2002 |
| JP | 2003-013967 | 1/2003 |
| JP | 2003-336645 | 11/2003 |
| JP | 2004-19921 | 1/2004 |
| JP | 2005-147331 | 6/2005 |
| JP | 2005-221001 | 8/2005 |

* cited by examiner

ROLLING BEARING, RETAINER SEGMENT AND MAIN SHAFT SUPPORT STRUCTURE OF WIND-POWER GENERATOR

TECHNICAL FIELD

The present invention relates to a rolling bearing, a retainer segment, and a main shaft support structure of a wind-power generator.

BACKGROUND ART

A rolling bearing comprises an outer ring, an inner ring, a plurality of rollers arranged between the outer ring and the inner ring, and a retainer for holding the plurality of rollers in general. The retainer for holding the rollers includes various kinds such as a resin retainer, a pressed retainer, a ground retainer, and a welded retainer depending on its material and manufacturing method, and those are used based on purposes and characteristics. In addition, the retainer is an integrated type, that is, it comprises one annular part in general.

Here, since a rolling bearing that supports a main shaft of a wind-power generator on which a blade for receiving wind is mounted needs to receive a high load, the rolling bearing itself is large in size. Thus, since each constituent member such as a roller and a retainer is also large in size, it is difficult to produce and assemble such member. In this case, when each member can be split, it can be easily produced and assembled.

Figure 10:
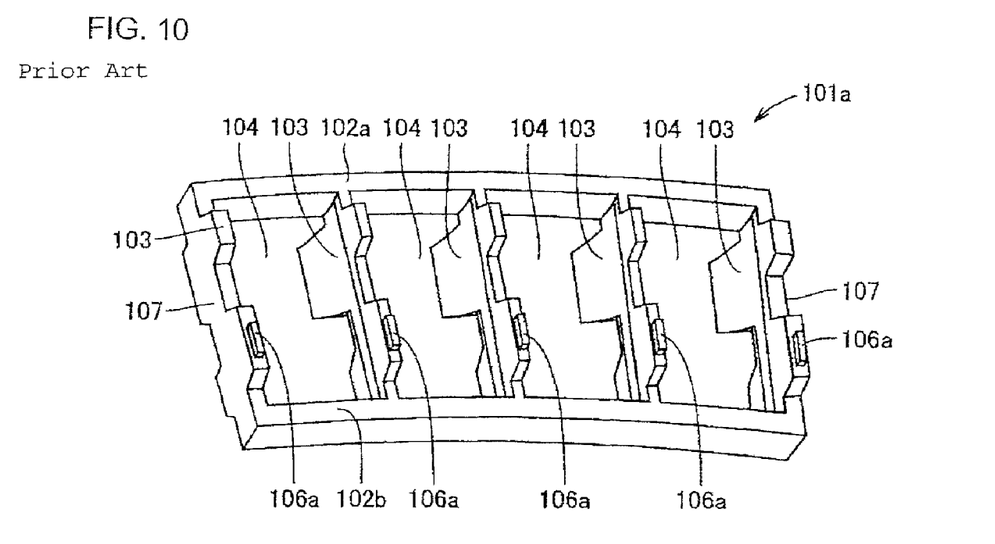
FIG. 10 is a perspective view showing a conventional retainer segment.

A split type retainer that is split along a split line extending in an axial direction is disclosed in European Patent Publication No. 1408248A2. FIG. 10 is a perspective view showing a retainer segment of the split type retainer disclosed in the European Patent Publication No. 1408248A2. Referring to FIG. 10, a retainer segment 101a has a plurality of pillar parts 103 extending in an axial direction so as to form a plurality of pockets 104 for holding rollers, and connection parts 102a and 102b extending in a circumferential direction so as to connect the plurality of pillar parts 103. On the inner diameter side of the pillar part 103 positioned on circumferential both sides of each pocket 104, an inner diameter-side roller stopper part is provided to prevent the roller housed in the pocket 104 from coming out toward the inner diameter side. Meanwhile, an outer-diameter side roller stopper part to prevent the roller from coming out toward the outer diameter side is not provided on the outer diameter side, and a flat part is provided. In addition, a projection 106a to keep a distance from an outer ring is provided at an end face of the pillar part 103 on the outer diameter side and a projection 106b (not shown) to keep a distance from an inner ring is provided at an end face of the pillar part 103 on the inner diameter side.

Figure 11:
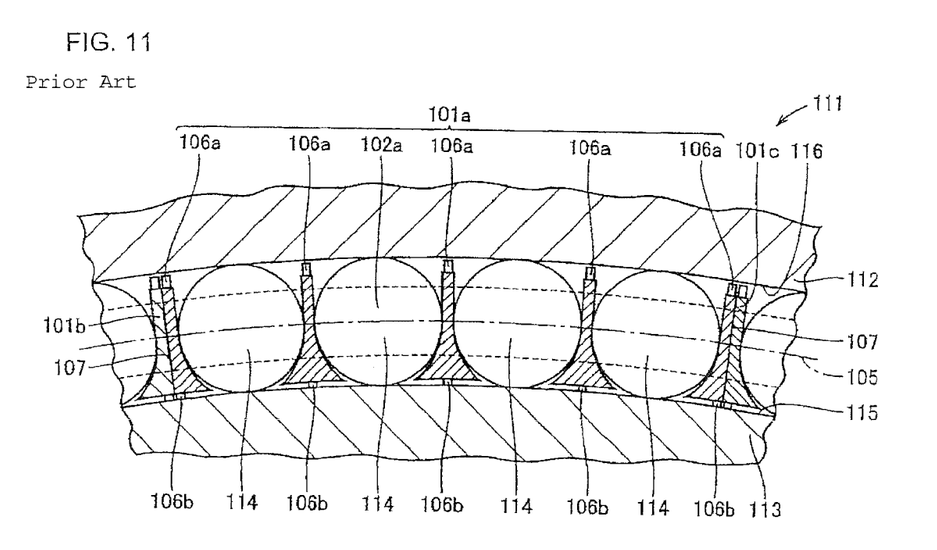
FIG. 11 is a sectional view showing the retainer segment in FIG. 10 when cut in the section containing a pillar part.

FIG. 11 is a sectional view showing a part of a rolling bearing containing the retainer segment 101a shown in FIG. 10. The constitution of a rolling bearing 111 containing the retainer segment 101a will be described with reference to FIGS. 10 and 11. The rolling bearing 111 has an outer ring 112, an inner ring 113, a plurality of rollers 114, and the plurality of retainer segments 101a, 101b and 101c holding the plurality of rollers 114. The plurality of rollers 114 are held by the plurality of retainer segments 101a and the like in the vicinity of a PCD (Pitch Circle Diameter) 105 in which the roller movement is most stable. The retainer segment 101a for retaining the plurality of rollers 114 is arranged such that circumferential end faces 107 abut on the circumferentially adjacent retainer segments 101b and 101c having the same configuration. The plurality of retainer segments 101a, 101b and 101c are continuously lined with each other, whereby one annular retainer contained in the rolling bearing 111 is formed.

According to the European Patent Publication No. 1408248A2, the retainer segment 101a keeps the distances from the outer ring 112 and the inner ring 113 by the projections 106a provided on the outer diameter side end face of the pillar part 103 and the projection 106b provided on the inner diameter side end face thereof. That is, the retainer segment 101a is guided by a track ring such as the outer ring 112 or the inner ring 113.

Since the retainer segments 101a, 101b and 101c are independent members and not coupled in the circumferential direction, when the retainer segment 101a is guided by the track ring, it is likely to move between the outer ring 112 and the inner ring 113, and its position is unstable in the radial direction.

More specifically, for example, in the case where the above rolling bearing 111 is set horizontally and used, when the retainer segment 101a is disposed at an uppermost position, the retainer segment 101a moves downward and an outer diameter surface 115 of the inner ring 113 positioned under it and the projection 106b provided on the inner diameter side end face of the pillar part 103 are brought into contact with each other, so that the retainer segment 101a is guided by the inner ring 113. Meanwhile, when the retainer segment 101a is disposed at an lowermost position, the retainer segment 101a moves downward and an inner diameter surface 116 of the outer ring 112 positioned under it and the projection 106a provided on the outer diameter side end face of the pillar part 103 are brought into contact with each other, so that the retainer segment 101a is guided by the outer ring 112.

Thus, since the retainer segment 101a is likely to move in the radial direction while it is guided by the inner ring or the outer ring depending on its position in the rolling bearing 111, the radial position of the retainer segment 101a becomes unstable and noise could be generated and the retainer segment 101a could be damaged when the retainer segment 101a comes in contact with the outer ring 112 or the inner ring 113.

Furthermore, the projections 106a and 106b could scrape off an oil film on the track surfaces 115 and 116 at the time of the rotation of the bearing, which could lower the lubrication performance of the rolling bearing 111 considerably.

DISCLOSURE OF THE INVENTION

It is an object of the present invention to provide a rolling bearing capable of preventing the generation of noise and damage.

It is another object of the present invention to provide a retainer segment capable of being arranged in the rolling bearing stably.

It is still another object of the present invention to provide a main shaft support structure of a wind-power generator capable of preventing the generation of noise and damage.

A rolling bearing according to the present invention comprises a plurality of rollers, and retainer retaining the plurality of rollers. The retainer is split into a plurality of retainer segments along a split line extending in an axial direction. Each retainer segment has a plurality of pillar parts extending in the axial direction so as to form a first pocket and a second pocket for housing the rollers, and a connection part extending in a circumferential direction so as to connect the plurality of pillar parts. The pillar part has an outer diameter side stopper part for limiting the movement of the roller housed in the first pocket toward the outer diameter side, and an inner diameter side roller stopper part for limiting the movement of the roller housed in the second pocket toward the inner diameter side.

According to this constitution, the movement of the retainer segment toward the inner diameter side is restricted by the outer diameter side roller stopper part provided in the pillar part of the retainer segment. In addition, the movement of the retainer segment toward the outer diameter side is restricted by the inner diameter side roller stopper part. As a result, the retainer segment is guided by the rollers and can be arranged in the rolling bearing stably. Thus, noise and damage of the retainer segment due to the contact between the retainer segment and the outer ring or the inner ring can be prevented. Here, the first pocket is provided with the means for preventing the roller from coming out toward the outer diameter side, and the second pocket is provided with the means for preventing the roller from coming out toward the inner diameter side. In addition, the retainer segment is provided by splitting the integrated annular retainer along the split line extending in the axial direction and has at least two pockets for housing the rollers. That is, the plurality of retainer segments is continuously lined with each other in a circumferential direction, whereby the one annular retainer is formed.

Since the retainer segments are continuously lined with each other to form the one annular retainer, the configuration of each retainer segment is small and simple. Therefore, it can be easily manufactured and its productivity is improved and its handling and assembling are also easy.

Preferably, the pillar part arranged between the first pocket and the second pocket has the outer diameter side roller stopper part and the inner diameter side roller stopper part. Thus, since the outer diameter side roller stopper part and the inner diameter side roller stopper part can be provided in the one pillar part, the first pocket and the second pocket can be adjacent to each other, and the number of pockets contained in the retainer segment can be reduced.

More preferably, the retainer segment has at least three pockets. Thus, it contains at least two first pockets or second pockets. Thus, since it contains at least two outer diameter side roller stopper parts or inner diameter side roller stopper parts, the retainer segment is not likely to be inclined with respect to the PCD in the rolling bearing, so that its stability is further improved.

Still preferably, the retainer segment is formed of a resin. The retainer segment is small in size and simple in configuration as compared with the integrated type retainer. Thus, when the retainer segment is formed of the resin, it can be manufactured by injection molding and the like and can be mass-produced.

Still preferably, the roller is a tapered roller. Since the above-described large rolling bearing used in the main shaft of the wind-power generator needs to receive a thrust load, a moment load and a radial load, a tapered roller bearing having the tapered roller is to be used. When such tapered roller bearing is used, even in the case where the tapered roller bearing becomes large in size, its productivity is high and the retainer segment can be arranged in the rolling bearing stably, so that noise and the like due to the contact with the outer ring and the like can be prevented.

According to another aspect of the present invention, a retainer segment retains a plurality of rollers and split along a split line extending in an axial direction. In addition, the retainer segment has a plurality of pillar parts extending in the axial direction so as to form a first pocket and a second pocket for housing the rollers, and a connection part extending in a circumferential direction so as to connect the plurality of pillar parts. The pillar part has an outer diameter side stopper part for limiting the movement of the roller housed in the first pocket toward the outer diameter side, and an inner diameter side roller stopper part for limiting the movement of the roller housed in the second pocket toward the inner diameter side.

Since such retainer segment is guided by the rollers, it can be arranged in the rolling bearing stably. Thus, noise and the like due to the contact with the outer ring or the inner ring can be prevented.

According to still another aspect of the present invention, a main shaft support structure of a wind-power generator comprises a blade for receiving wind power, a main shaft having one end fixed to the blade and rotating with the blade, and a rolling bearing incorporated in a fixing member and supporting the main shaft rotatably. The rolling bearing comprises a plurality of rollers, and a retainer retaining the plurality of rollers. The retainer is split into a plurality of retainer segments along a split line extending in an axial direction. Each retainer segment has a plurality of pillar parts extending in the axial direction so as to form a first pocket and a second pocket for housing the rollers, and a connection part extending in a circumferential direction so as to connect the plurality of pillar parts. The pillar part has an outer diameter side stopper part for limiting the movement of the roller housed in the first pocket toward the outer diameter side, and an inner diameter side roller stopper part for limiting the movement of the roller housed in the second pocket toward the inner diameter side.

According to the main shaft support structure of the wind-power generator having the rolling bearing provided with the above retainer segments, since the retainer segment can be arranged stably, noise and damage is prevented from being generated.

According to the present invention, the retainer segment can be restricted from moving toward the inner diameter side by the outer diameter side roller stopper part provided in the pillar part. In addition, the retainer segment is restricted from moving toward outer diameter side by the inner diameter side roller stopper part. As a result, the retainer segment is guided by the rollers and stably arranged in the rolling bearing. Thus, noise and the damage of the retainer segment due to the contact between the retainer segment and the outer ring or the inner ring can be prevented.

In addition, since the retainer segment is guided by the rollers, it can be stably arranged in the rolling bearing. Thus, the contact with the outer ring or the inner ring is reduced.

Furthermore, according to the main shaft support structure of the wind-power generator having the rolling bearing provided with the retainer segment, since the retainer segment can be stably arranged, noise and damage is not likely to be generated.

In addition, it is still another object of the present invention is to provide a rolling bearing in which noise and damage are not likely to be generated and lubrication performance is excellent, a retainer segment stably arranged in the rolling bearing, and a main shaft support structure of a wind-power generator provided with the rolling bearing.

A rolling bearing according to the present invention comprises an inner ring having a flange part, a plurality of rollers arranged along an outer diameter surface of the inner ring, and a retainer having pockets for housing the plurality of rollers. The retainer is split into a plurality of retainer segments split along a split line extending in an axial direction. Preferably, each retainer segment has a pair of arc-shaped ring parts, a plurality of pillar parts arranged between the pair of ring parts and extending in the axial direction so as to form the pockets, and an inner ring abutment part projecting from an inner diameter surface of the pair of ring parts toward the radial inner side and abutting on the flange part of the inner ring, and the pillar part has a roller stopper part for limiting the movement of the roller housed in the pocket toward the inner diameter side.

According to the above rolling bearing, the movement of the retainer segment toward the radial inner side is limited by the inner ring flange part and the movement thereof toward the radial outer side is limited by the rollers. Thus, the behavior of the retainer at the time of the rotation of the bearing becomes stable and noise and the damage of the retainer segment due to the contact between the retainer segment and the outer ring or inner ring can be prevented. Furthermore, since the retainer segment is not in contact with the track surfaces of the outer ring and the inner ring at the time of the rotation of the bearing, the rolling bearing is superior in lubrication performance.

Preferably, the retainer segment is formed of a resin. The retainer segment is small in size and simple in configuration as compared with the integrated type retainer. Thus, when the retainer segment is formed of the resin, it can be manufactured by injection molding and the like and can be mass-produced.

Still preferably, the roller is a tapered roller. Since the above-described large rolling bearing used in the main shaft of the wind-power generator needs to receive the thrust load, the moment load and the radial load, a tapered roller bearing having the tapered roller is to be used. When such tapered roller bearing is used, even in the case where the tapered roller bearing becomes large in size, its productivity is high and the retainer segment can be arranged in the rolling bearing stably, and noise and the like due to the contact with the outer ring and the like can be prevented.

A retainer segment according to the present invention has pockets for housing a plurality of rollers and split along a split line extending in an axial direction. More specifically, each retainer segment has a pair of arc-shaped ring parts, a plurality of pillar parts arranged between the pair of ring parts and extending in the axial direction so as to form the pockets, and an inner ring abutment part projecting from an inner diameter surface of the pair of ring parts toward the radial inner side and abutting on a flange part of a bearing inner ring.

Since such retainer segment is guided by the flange part of the bearing inner ring, it is not in contact with the track surface of the bearing inner ring. As a result, since the retainer segment does not scrape off an oil film on the track surface at the time of the rotation of the bearing, the lubrication performance of the bearing can be improved.

A main shaft support structure of a wind-power generator according to the present invention has a blade for receiving wind power, a main shaft having one end fixed to the blade and rotating with the blade, and a rolling bearing incorporated in a fixing member and supporting the main shaft rotatably. The rolling bearing comprises an inner ring having a flange part, a plurality of rollers arranged along an outer diameter surface of the inner ring, and a retainer having pockets for housing the plurality of rollers. The retainer is split into a plurality of retainer segments along a split line extending in an axial direction. Furthermore, each retainer segment comprises a pair of arc-shaped ring parts, a plurality of pillar parts arranged between the pair of ring parts and extending in the axial direction so as to form the pockets, and an inner ring abutment part projecting from an inner diameter surface of the pair of ring parts toward the radial inner side and abutting on the flange part of the inner ring.

According to the above rolling bearing, since the retainer segment is not in contact with the track surface of the inner ring, it is superior in lubrication performance. When the rolling bearing is employed as the bearing supporting the main shaft of the wind power generator, the main shaft support structure of the wind-power generator is high in reliability.

In addition, the movement of the retainer segment in the radial direction is limited by the flange part of the inner ring and the roller. As a result, the rolling bearing can prevent noise and the damage of the retainer segment due to the contact between the retainer segment and the outer ring or the inner ring from being generated and superior in lubrication performance.

Furthermore, when the rolling bearing provided with the above retainer segment is employed as the bearing supporting the main shaft of the wind-power generator, the main shaft support structure of the wind-power generator is superior in reliability.

BEST MODE FOR CARRYING OUT THE INVENTION

Figure 1:
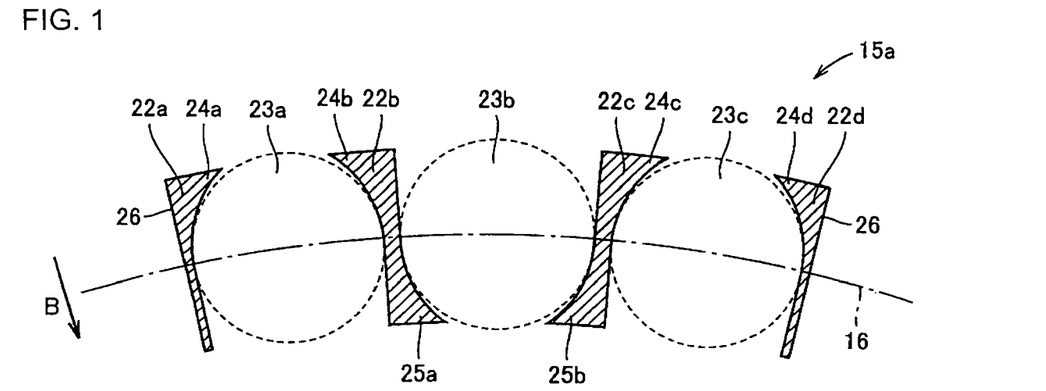
FIG. 1 is a sectional view showing a retainer segment according to one embodiment of the present invention when cut in a section containing a pillar part.
Figure 2:
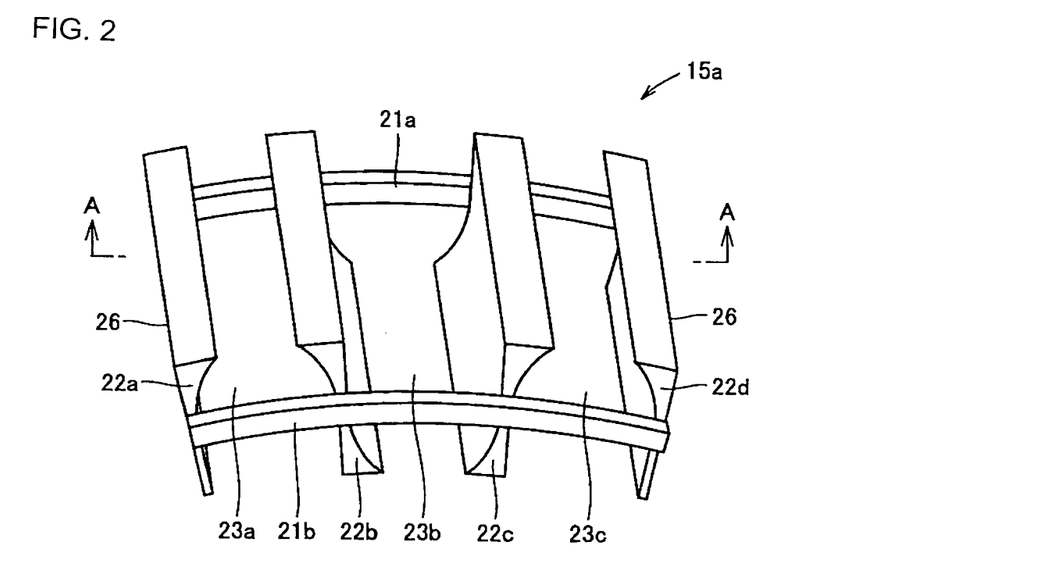
FIG. 2 is a perspective view showing the retainer segment according to one embodiment of the present invention.

Embodiments of the present invention will be described with reference to the drawings hereinafter. FIG. 2 is a perspective view showing a retainer segment according to one embodiment of the present invention. FIG. 1 is a sectional view showing the retainer segment cut at a section shown by arrows A and A in FIG. 2. In addition, in FIG. 1, a plurality of rollers retained by the retainer segment are shown by dotted lines and connection parts 21a and 21b are not shown for easy understanding.

Referring to FIGS. 1 and 2, a retainer segment 15a comprises four pillar parts 22a, 22b, 22c and 22d extending in an axial direction so as to form two first pockets 23a and 23c and one second pocket 23b for housing the rollers, and the connection parts 21a and 21b extending in a circumferential direction so as to connect the four pillar parts 22a, 22b, 22c and 22d. The connection parts 21a and 21b have predetermined curvatures in the circumferential direction such that the plurality of retainer segments 15a and the like are continuously lined with each other in the circumferential direction to form one annular retainer when incorporated in the rolling bearing. That is, the retainer segment 15a is provided by cutting and splitting the integrated annular retainer along a split line extending in the axial direction so as to contain the first and second pockets 23a to 23c. In addition, although the plurality of connection parts 21a and 21b are provided in this example, the number of the connection part may be one.

Outer diameter side roller stopper parts 24a and 24b for limiting the movement of the roller held in the first pocket 23a toward the outer diameter side are provided on the outer diameter side of the pillar parts 22a and 22b positioned on circumferential both sides of the first pocket 23a.

Thus, even when the retainer segment 15a tries to move toward the inner diameter side of a shaft, that is, in the direction shown by arrow B in FIG. 1, since the outer diameter side roller stopper parts 24a and 24b are caught by the roller, so that the movement of the retainer segment 15a toward the inner diameter side is restricted.

In addition, inner diameter side roller stopper parts 25a and 25b for limiting the movement of the roller held in the second pocket 23b toward the inner diameter side are provided on the inner diameter side of the pillar parts 22b and 22c positioned on circumferential both sides of the second pocket 23b adjacent to the first pocket 23a. Thus, even when the retainer segment 15a tries to move toward the outer diameter side of the shaft, that is, in the direction opposite to the direction shown by arrow B in FIG. 1, since the inner diameter side roller stopper parts 25a and 25b are caught by the roller, so that the movement of the retainer segment 15a toward the outer diameter side is restricted.

Furthermore, outer diameter side roller stopper part 24c and 24d for limiting the movement of the roller held in the first pocket 23c toward the outer diameter side are provided on the outer diameter side of the pillar parts 22c and 22d positioned on circumferential both sides of the first pocket 23c adjacent to the second pocket 23b. Thus, even when the retainer segment 15a tries to move toward the inner diameter side of the shaft, that is, in the direction shown by arrow B in FIG. 1, since the outer diameter side roller stopper parts 24c and 24d are caught by the roller, so that the movement of the retainer segment 15a toward the inner diameter side is restricted.

As described above, even when the retainer segment 15a tries to move toward inner diameter side, the outer diameter side roller stopper parts 24a, 24b, 24c and 24d of the first pockets 23a and 23c are caught by the rollers, so that the movement thereof toward the inner diameter side is prevented. In addition, even when the retainer segment 15a tries to move toward outer diameter side, the inner diameter side roller stopper parts 25a and 25b of the second pocket 23b are caught by the roller, so that the movement thereof toward the outer diameter side is prevented. As a result, the movement of the retainer segment 15a in the radial direction is restricted by the rollers. According to this constitution, since the retainer segment 15a is guided by the rollers, the radial position thereof can be arranged stably.

In addition, since the retainer segment 15a is an independent member, it is likely to be inclined with respect to a PCD 16 in the rolling bearing. However, since the retainer segment 15a has three pockets in total such as two first pockets 23a and 23c on both ends thereof and the one second pocket 23b in the center thereof, the retainer segment 15a is not likely to be inclined with respect to the PCD 16, so that it is stably arranged.

Here, the pillar part 22b positioned between the first pocket 23a and the second pocket 23b has the outer diameter side roller stopper part 24b on its outer diameter side, and the inner diameter side roller stopper part 25a on its inner diameter side. In addition, similarly, the pillar part 22c positioned between the second pocket 23b and the first pocket 23c has the outer diameter side roller stopper part 24c on its outer diameter side, and the inner diameter side roller stopper part 25b on its inner diameter side. According to this constitution, the first pockets 23a and 23c and the second pocket 23b can be adjacently arranged and as a whole, the number of the first and second pockets contained in the retainer segment 15a can be reduced.

Figure 3:
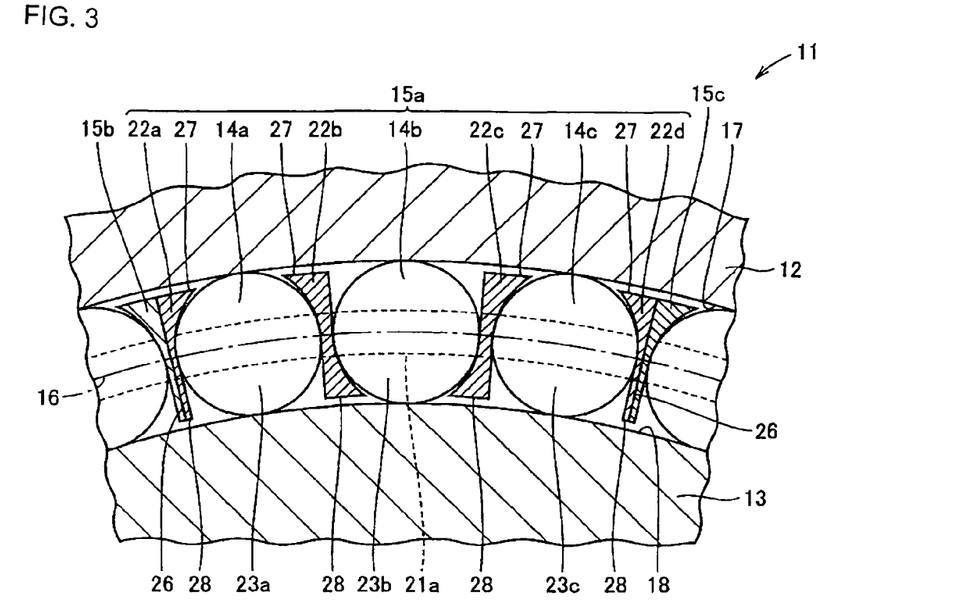
FIG. 3 is a sectional view showing one part of a rolling bearing according to one embodiment of the present invention.

FIG. 3 is a sectional view showing one part of a rolling bearing 11 provided with the retainer segment 15a shown in FIGS. 1 and 2. Referring to FIGS. 1, 2 and 3, the rolling bearing 11 comprises an outer ring 12, and an inner ring 13, a plurality of rollers 14a, 14b and 14c arranged between the outer ring 12 and the inner ring 13, and a plurality of retainer segments 15a and the like for retaining the rollers 14a and the like. Retainer segments 15b and 15c adjacent to the retainer segment 15a are arranged in the rolling bearing 11 in the circumferential direction such that they are opposed to outer width faces 26 of the pillar parts 22a and 22d positioned at the outermost ends in the circumferential direction. When the retainer segments 15a, 15b and 15c are continuously lined with each other and assembled, one annular retainer is formed.

As described above, since the retainer segment 15a is guided by the rollers, the retainer segment 15a is stably arranged in the radial direction in the rolling bearing 11. Therefore, noise due to the contact between end faces 27 on the radial outer side of the pillar parts 22a to 22d of the retainer segment 15a and an inner diameter surface 17 of the outer ring 12 positioned on the outer diameter side and the contact between end faces 28 of the radial inner side of the pillar parts 22a to 22d thereof and an outer diameter surface 18 of the inner ring 13 positioned on the inner diameter side is prevented. In addition, accordingly, the retainer segment 15a is not likely to be damaged due to the contact with the outer ring 12 and the like.

Figure 4A:
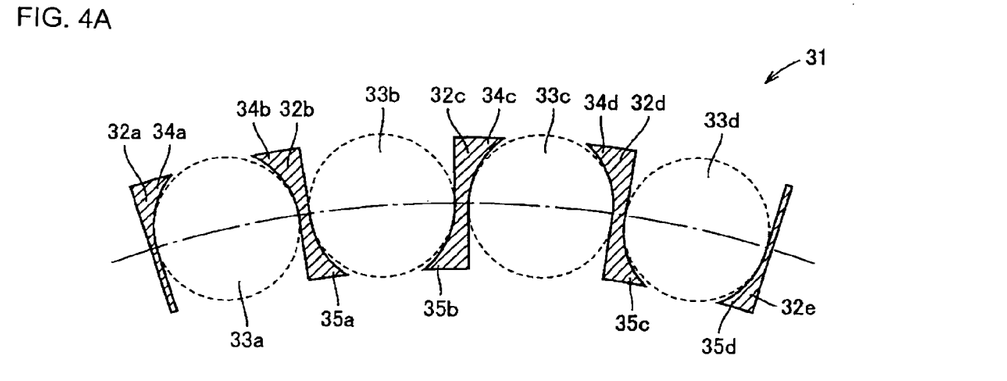
FIG. 4A is a sectional view showing a retainer segment according to another embodiment of the present invention, in which a first pocket and a second pocket are alternately provided.
Figure 4B:
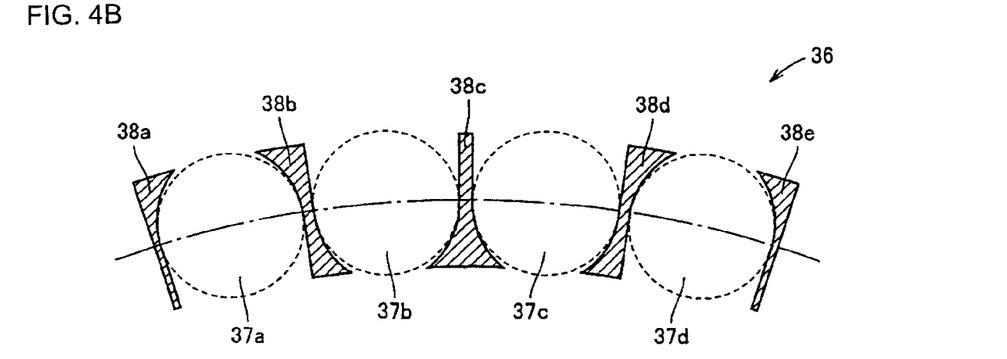
FIG. 4B is a sectional view showing a retainer segment according to still another embodiment of the present invention, in which a first pocket and a second pocket are not alternately provided.

In addition, although the retainer segment 15a has three pockets such as the first and second pockets for housing the rollers in the above embodiment, it may have two or more first pockets and two or more second pockets, that is, four or more pockets in total. FIGS. 4A and 4B are sectional views each showing a retainer segment having four pockets in total, that is, two first pockets and two second pockets. Referring to FIG. 4A first, a retainer segment 31 comprises a plurality of pillar parts 32a, 32b, 32c, 32d and 32e extending in an axial direction so as to form two first pockets 33a and 33c and two second pockets 33b and 33d, and a connection part (not shown) extending in a circumferential direction so as to connect the plurality of pillar parts 32a, 32b, 32c, 32d and 32e. Outer diameter side roller stopper parts 34a, 34b, 34c and 34d for limiting the movement of the roller housed in the first pockets 33a and 33c toward the outer diameter side are provided on the outer diameter side of the pillar parts 32a, 32b, 32c and 32d positioned on circumferential both sides of the first pockets 33a and 33c. In addition, inner diameter side roller stopper parts 35a, 35b, 35c and 35d for limiting the movement of the roller housed in the second pockets 33b and 33d toward the inner diameter side are provided on the inner diameter side of the pillar parts 32b, 32c, 32d and 32e positioned on circumferential both sides of the second pockets 33b and 33d.

Thus, the outer diameter side roller stopper parts 34a, 34b, 34c and 34d provided in the pillar parts 32a, 32b, 32c and 32d of the two first pockets 33a and 33c that are not adjacent to each other restrict the movement of the retainer segment 31 toward the inner diameter side, and the inner diameter side roller stopper parts 35a, 35b, 35c and 35d provided in the pillar parts 32b, 32c, 32d and 32e of the two second pockets 33b and 33d that are not adjacent to each other restrict the movement of the retainer segment 31 toward the outer diameter side, among the first and second pockets 33a, 33b, 33c and 33d. Therefore, since the movement toward the outer diameter side and the inner diameter side are restricted by the two first pockets and the two second pockets alternately, the retainer segment 31 can be further stably arranged and the retainer segment 31 is further not likely to be inclined with respect to the PCD in the rolling bearing.

In addition, as shown in FIG. 4B, a retainer segment 36 has two first pockets 37a and 37d and two second pockets 37b and 37c, in which inner diameter side roller stopper parts provided in pillar parts 38b, 38c and 38d positioned on the circumferential both sides of the adjacent second pockets 37b and 37c restrict the movement toward the outer diameter side, and outer diameter side roller stopper parts provided in pillar parts 38a, 38b, 38d and 38e positioned on the circumferential both sides of the first pockets 37a and 37d positioned on both end sides of the retainer segment 36 restrict the movement toward the inner diameter side. In this case also, since the movement toward the outer diameter side and inner diameter side are restricted by the two first pockets and the two second pockets, the retainer segment 36 can be further stably arranged and the retainer segment 36 is further not likely to be inclined with respect to the PCD in the rolling bearing similar to the above.

In addition, in the above embodiment, the roller housed in the retainer segment may be a cylindrical roller and a tapered roller whose diameter is gradually increased in the axial direction. When the tapered roller is used, the distance of the wall surfaces of the pillar parts abutting on the tapered roller in the retainer segment may be gradually increased from the small diameter end face to the large diameter end face of the tapered roller.

Figure 5:
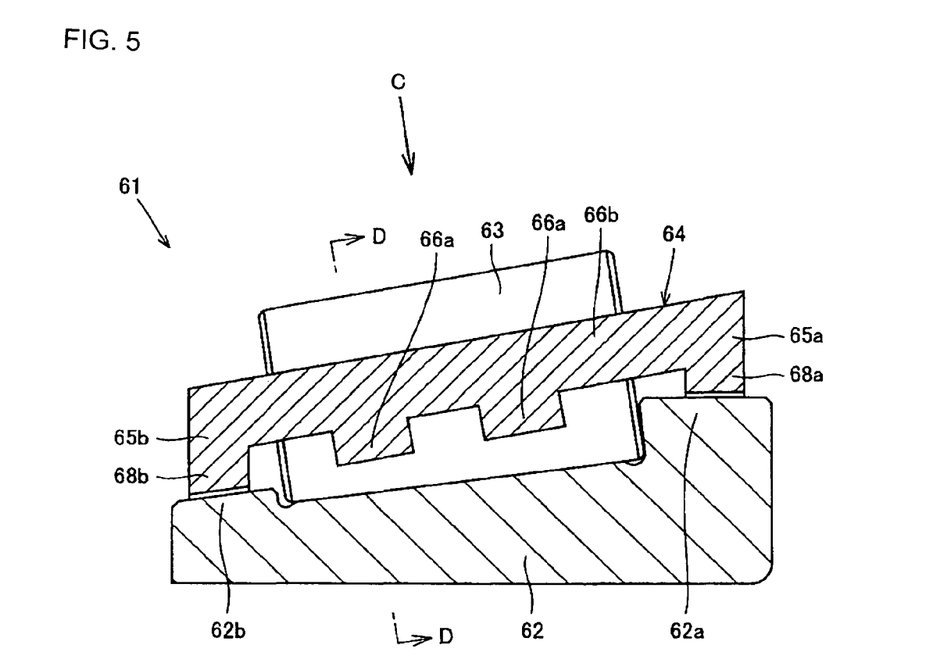
FIG. 5 is a sectional view showing a tapered roller bearing according to still another embodiment of the present invention.

Next, a rolling bearing and a retainer segment according to still another embodiment of the present invention will be described with reference to FIGS. 5 to 7. FIG. 5 is a view showing the rolling bearing according to still another embodiment of the present invention, and FIG. 6 is a view showing the retainer segment viewed from arrow C in FIG. 5, and FIG. 7 is a sectional view taken along line D-D in FIG. 5.

Referring to FIG. 5, the rolling bearing is a tapered roller bearing 61 that comprises an inner ring 62, an outer ring (not shown), a plurality of tapered rollers 63 arranged between the inner ring 62 and the outer ring, and a retainer 64 having pockets for housing the plurality of tapered rollers 63. The retainer 64 is split into a plurality of retainer segments 64a, along a split line extending in an axial direction.

The inner ring 62 is an annular member and has a large flange 62a and a small flange 62b as flange parts at axial both ends of its outer diameter surface, in which a rolling space is provided between the large flange 62a and the small flange 62b to receive the tapered roller 63.

Figure 6:
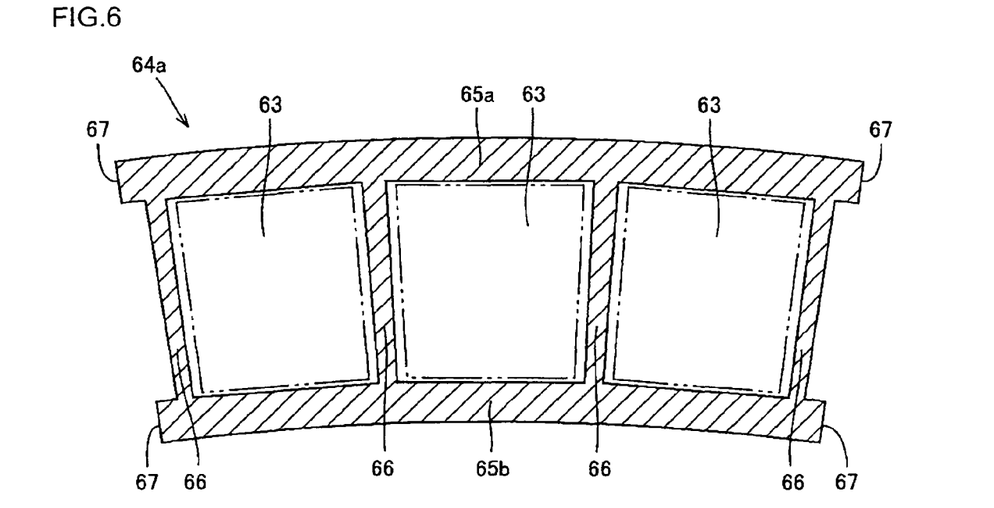
FIG. 6 is a view showing the tapered roller bearing viewed from arrow C in FIG. 5.
Figure 7:
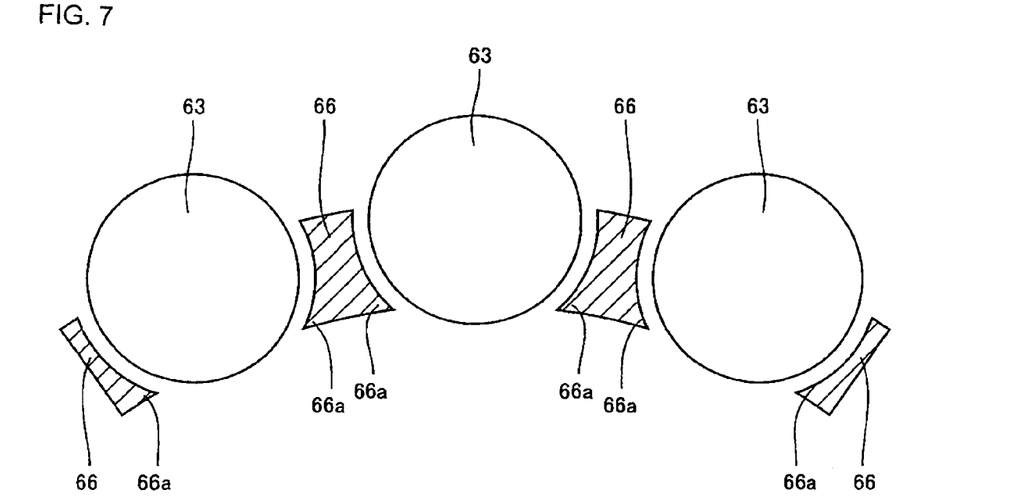
FIG. 7 is a sectional view showing the rolling bearing taken along line D-D in FIG. 5.

FIG. 6 is an enlarged view showing the retainer segment 64a. Referring to FIG. 6, the retainer segment 64a has a pair of ring parts 65a and 65b, and a plurality of pillar parts 66 arranged between the pair of ring parts 65a and 65b and extending in the axial direction so as to form pockets for housing the tapered rollers 63. According to the embodiment shown in FIG. 6, three pockets are formed by the four pillar parts 66, and one tapered roller 63 is housed in each pocket. In addition, since the other retainer segments have the same constitution as that of the retainer segment 64a, their descriptions are omitted.

Each of the ring parts 65a and 65b is in the form of a circular arc, and has abutment end faces 67 abutting on the adjacent retainer segments at both ends, and inner ring abutment parts 68a and 68b projecting from the inner diameter surfaces of the ring parts 65a and 65b toward the radial inner side as shown in FIG. 5. When the retainer segments are assembled, a circular configuration is formed along the inner ring 62 and the outer ring. In addition, the curvature radius of the ring part 65a of the tapered roller 63 on the large end face side is set so as to be larger than that of the ring part 65b positioned on the small end face in order to hold the tapered roller 63 appropriately.

FIG. 7 is the sectional view showing the configuration of the pillar part 66 taken along line D-D in FIG. 5. In addition, the inner ring 62 and the ring part 65a are not shown for simplification. Referring to FIG. 7, the end face of the pillar part 66 forming the pocket has a curved configuration along the rolling surface of the tapered roller 63, and a roller stopper part 66a for limiting the movement of the tapered roller 63 toward the inner diameter side is provided at its innermost part. In addition, as shown in FIG. 6, the width dimension of the pillar part 66 is increased from the side of the ring part 65b to the ring part 65a, and the pocket has a trapezoidal configuration so as to follow the outline of the tapered roller 63.

When the above retainer segment 64a is incorporated in the tapered roller bearing 61, the inner ring abutment part 68a abuts on the large flange 62a of the inner ring 62, and the inner ring abutment part 68b abuts on the small flange 62b of the inner ring 62. Therefore, when the retainer segment 64a is arranged at an uppermost position, the inner ring abutment members 68a and 68b are in contact with the flange parts 62a and 62b and the retainer segment 64a is guided by the inner ring flanges.

Meanwhile, when the retainer segment 64a is arranged at a lowermost position, the movement of the retainer segment 64a in the lower direction is limited by the roller stopper part 66a. Therefore, the retainer segment 64a is guided by the roller in this position.

Thus, the movement of the retainer segment 64a toward the radial inner side is limited by the inner ring flange parts 62a and 62b, and the movement thereof to the radial outer side is limited by the tapered roller 63, whereby noise and damage of the retainer segment 64a due to the contact between the retainer segment 64a and the inner ring 62 or the outer ring can be prevented. In addition, since the retainer segment 64a does not scrape off the oil film on track surfaces of the inner and outer rings, the rolling bearing is superior in lubrication performance.

In addition, although the abutment end faces 67 project from the right and left both ends of the pillar part 66 in the above embodiment, the present invention is not limited to this and can be applied to the case where the abutment end faces 67 do not project from the right and left both ends of the pillar part 66. However, in the case of the structure in which the pillar parts 66 of the adjacent retainer segments are in contact with each other, since the pillar part 66 could be deformed or damaged at the time of rotation of the bearing, it is preferable that the pillar parts 66 of the adjacent retainer segments are not in contact with each other.

In addition, although the description has been made of the case where the tapered roller 63 is not housed between the adjacent retainer segments, the present invention is not limited to this and can be applied to the case where a pocket is formed between the abutment parts of the adjacent retainer segments and the tapered roller may be housed therein. In this case, the load capacity of the tapered roller bearing 61 can be increased.

In addition, it is assumed that the retainer 64 can be formed by combining two or more retainer segments and the number of the rollers housed in each retainer segment can be selected optionally. In addition, when all the retainer segments are assembled, an intermediate element for adjusting a gap may be arranged between the retainer segments to fill the circumferential gap formed between the retainer segments.

Furthermore, the description has been made of the case where the single row tapered roller bearing 61 employs the tapered roller 63 in the above embodiment, the present invention may be applied to a double row tapered roller bearing. In addition, the present invention can be applied to various kinds of rolling bearings such as a self-aligning roller bearing having a spherical roller, and a cylindrical roller bearing having a cylindrical roller.

Figure 8:
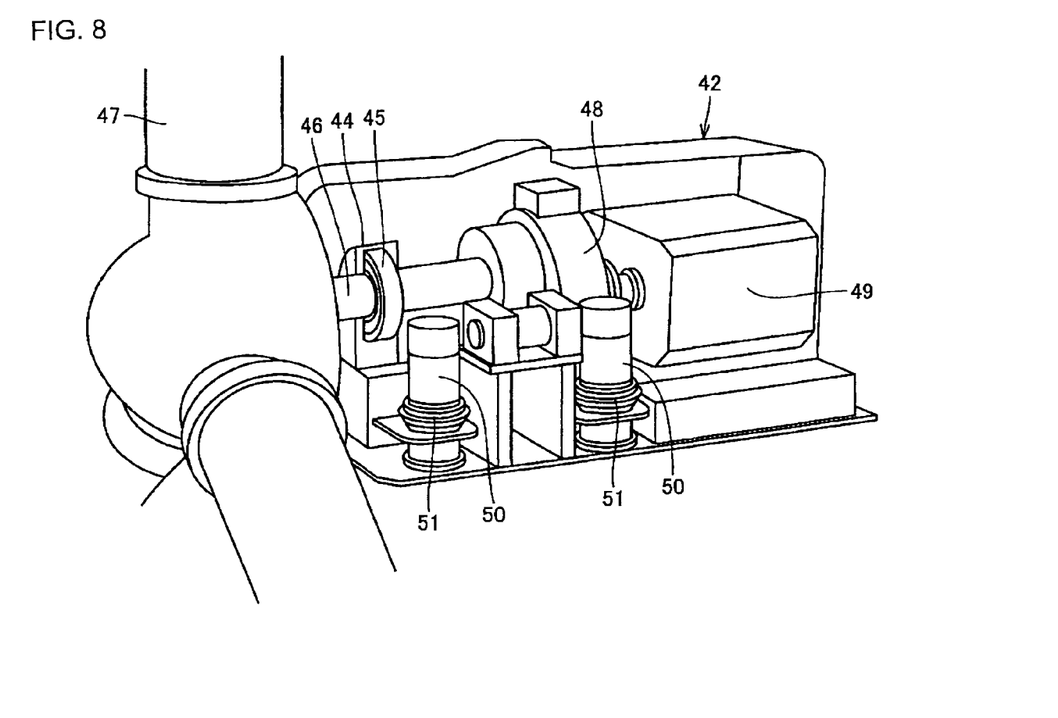
FIG. 8 is a schematic view showing one example of a main shaft support structure of a wind-power generator comprising the rolling bearing according to the present invention.
Figure 9:
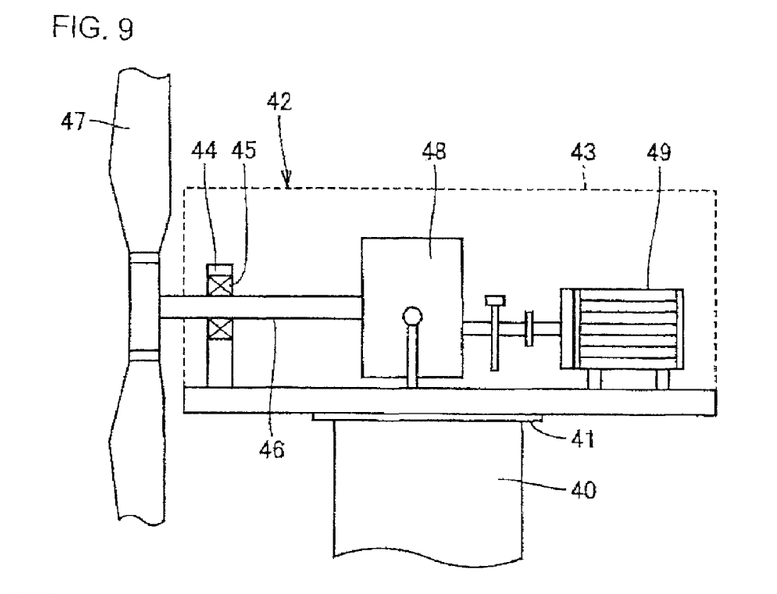
FIG. 9 is a schematic side view showing the main shaft support structure of the wind-power generator in FIG. 8.

FIGS. 8 and 9 show one example of a main shaft support structure of a wind-power generator in which the above rolling bearing is used as a main shaft support bearing 45. A casing 43 of a nacelle 42 for supporting the main part of the main shaft support structure is put on a support table 40 through a slewing bearing 41 at a high position so as to be horizontally turned. A blade 47 receiving wind power is fixed to one end of a main shaft 46. The main shaft 46 is rotatably supported in the casing 43 of the nacelle 42 through the main shaft support bearing 45 incorporated in a bearing housing 44, and the other end of the main shaft 46 is connected to a speed-up gear 48, and an output shaft of the speed-up gear 48 is coupled to a rotor shaft of a generator 49. The nacelle 42 is turned in any angle by a rotation motor 50 through a speed-down gear 51.

The main shaft support bearing 45 incorporated in the bearing housing 44 is the rolling bearing according to one embodiment of the present invention and comprises the plurality of rollers and the retainer for holding the rollers. The retainer is split into the plurality of retainer segments along the split line extending in the axial direction. Each retainer segment comprises the plurality of pillar parts extending in the axial direction so as to form the first and second pockets for holding the rollers, and the connection part extending in the circumferential direction so as to connect the plurality of pillar parts. The pillar part has the outer diameter side roller stopper part for limiting the movement of the roller housed in the first pocket toward the outer diameter side and the inner diameter side roller stopper part for limiting the movement of the roller housed in the second pocket to the inner diameter side.

Since the main shaft support bearing 45 supports the main shaft 46 whose one end is fixed to the blade 47 receiving great wind power, it receives a high load. Thus, the main shaft support bearing 45 has to be large itself. Here, when the rolling bearing comprises the retainer segments that can be split, since the productivity, handling property and assembling property of the retainer can be improved, the productivity of the rolling bearing itself can be improved. In addition, since the retainer segment is guided by the roller and it can be stably arranged in the radial direction, it is not likely to be in contact with the outer ring or the inner ring, so that noise due to the contact can be prevented from being generated and the damage due to the contact can be prevented.

In addition, the rolling bearing according to still another embodiment of the present invention as shown in FIGS. 6 to 7, for example may be applied to the main shaft support bearing 45 incorporated in the bearing housing 44.

Since the main shaft support bearing 45 supports the main shaft 46 whose one end is fixed to the blade 47 receiving great wind power, it receives a high load. Thus, the main shaft support bearing 45 has to be large itself. Here, when the rolling bearing comprises the retainer segments that can be split, since the productivity, handling property and assembling property of the retainer can be improved, the productivity of the rolling bearing itself can be improved.

In addition, since the above rolling bearing can prevent noise and the damage of the retainer segment due to the contact between the retainer segment and the inner ring or the outer ring, and the lubrication performance of the tapered roller bearing can be improved, the main shaft support structure of the wind-power generator is superior in reliability.

Furthermore, although the split part at the circumferential end of the retainer segment is positioned at the pillar part in the above embodiment, the present invention is not limited to this and may be applied to the case where the split part is positioned at the connection part. In this case, the retainer segment is continuously lined with each other at the connection parts.

In addition, even when the rolling bearing provided with the above retainer segment 15a is large in size, since the retainer segment 15a is small in size and simple in configuration, when it is formed of a resin by injection molding, it can be easily manufactured. Thus, the productivity thereof can be high.

In addition, the connection parts 21a and 21b and the ring parts 65a and 65b of the retainer segment 15a and the like are designed to have predetermined curvatures in the above embodiment. However, the connection parts 21a and 21b and the ring parts 65a and 65b may not have the predetermined curvature at the time of production and may be linearly formed of a flexible resin so as to be elastic in the circumferential direction so as to have the predetermined curvature when incorporated in the rolling bearing. In this case, the retainer segment 15a and the like can be simpler in configuration at the time of production, so that the productivity thereof is further improved.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

Since the retainer segment according to the present invention can be stably arranged in the rolling bearing, and the rolling bearing according to the present invention can prevent the contact between the retainer segment and the outer ring and the like, they can be effectively used as the retainer segment and the rolling bearing required to prevent noise.

In addition, since the main shaft support structure of the wind-power generator according to the present invention comprises the rolling bearing in which the split type retainer segment can be stably arranged, it can be effectively applied to the case required to be large in size and prevent noise.

The retainer segment according to the present invention can be advantageously used in the large-size rolling bearing such as the bearing supporting the main shaft of the wind-power generator.

The invention claimed is:

1. A rolling bearing comprising a plurality of rollers, and a retainer retaining said plurality of rollers, wherein
said retainer is split into a plurality of retainer segments along a split line extending in an axial direction,
said each retainer segment has a plurality of pillar parts extending in the axial direction so as to form a first pocket and a second pocket for housing the rollers, and a connection part extending in a circumferential direction so as to connect the plurality of pillar parts,
the pillar parts forming the first pocket being adjacent to each other, each of adjacent pillar parts forming the first pocket having an outer diameter protrusion on an outer diameter side end to limit movement of a roller housed in the first pocket towards the outer diameter side, with an inner diameter side end of each of the adjacent pillars configured so that the roller housed in the first pocket can move towards the inner diameter side, and
the pillar parts forming the second pocket being adjacent to each other, each of the adjacent pillar parts forming the second pocket having an inner diameter protrusion on an inner diameter side end to limit movement of a roller housed in the second pocket towards the inner diameter side, with an outer diameter side end of each of the adjacent pillar parts forming the second pocket configured so that the roller housed in the second pocket can move towards the outer diameter side.

2. The rolling bearing according to claim 1, wherein the pillar part disposed between said first pocket and said second pocket has said outer diameter side roller stopper part and said inner diameter side roller stopper part.

3. The rolling bearing according to claim 1, wherein said retainer segment has at least three pockets.

4. The rolling bearing according to claim 1, wherein said retainer segment is formed of a resin.

5. The rolling bearing according to claim 1, wherein said roller is a tapered roller.

6. A retainer segment retaining a plurality of rollers and split along a split line extending in an axial direction, wherein
said retainer segment has a plurality of pillar parts extending in the axial direction so as to form a first pocket and a second pocket for housing the rollers, and a connection part extending in a circumferential direction so as to connect the plurality of pillar parts, and
the pillar parts forming the first pocket being adjacent to each other, each of adjacent pillar parts forming the first pocket having an outer diameter protrusion on an outer diameter side end to limit movement of a roller housed in the first pocket towards the outer diameter side, with an inner diameter side end of each of the adjacent pillars lacking protrusions so that the roller housed in the first pocket can move towards the inner diameter side, and
the pillar parts forming the second pocket being adjacent to each other, each of the adjacent pillar parts forming the second pocket having an inner diameter protrusion on an inner diameter side end to limit movement of a roller housed in the second pocket towards the inner diameter side, with an outer diameter side end of each of the adjacent pillar parts forming the second pocket lacking protrusions so that the roller housed in the second pocket can move towards the outer diameter side.

* * * * *